UNITED STATES PATENT OFFICE.

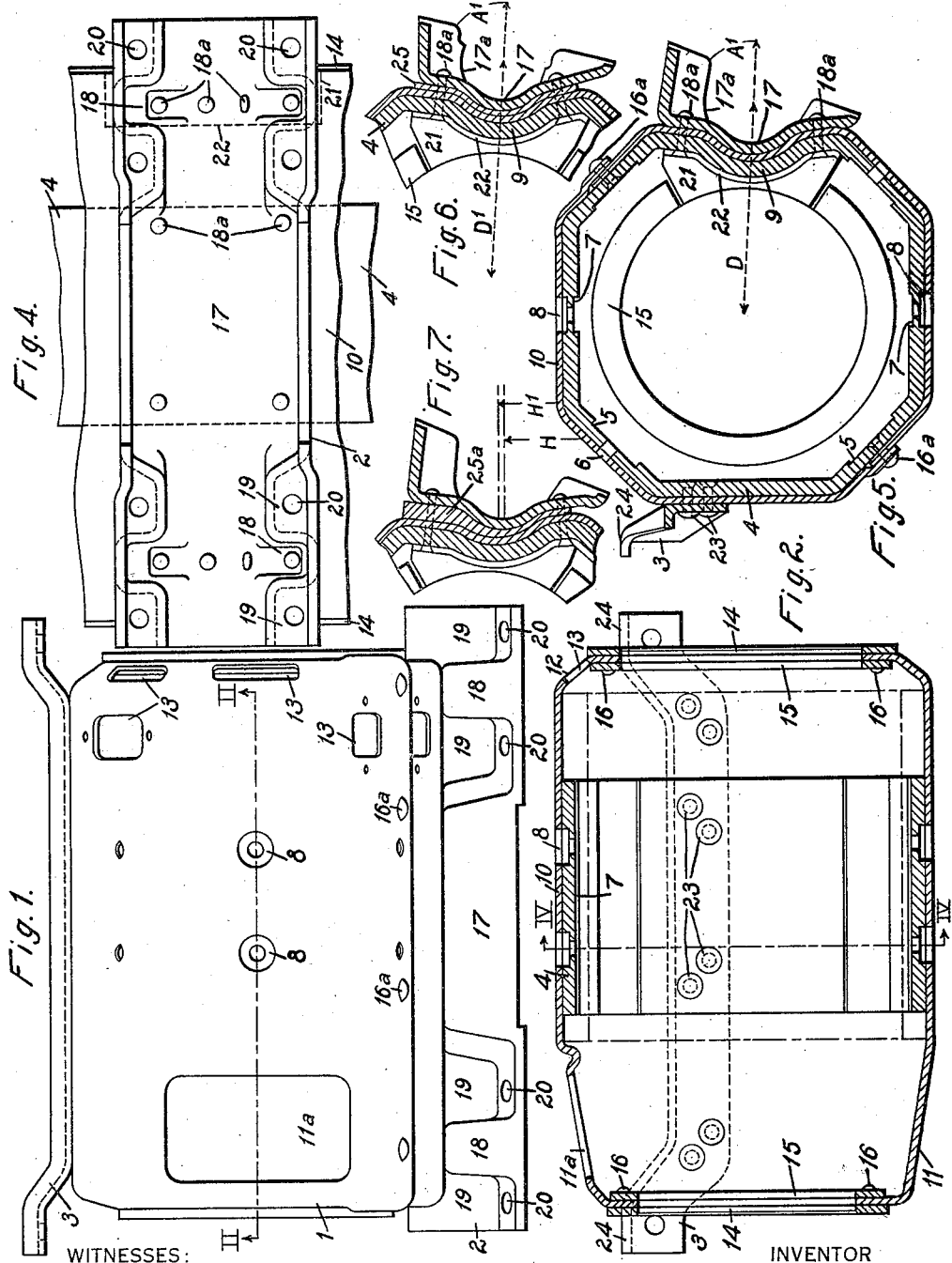

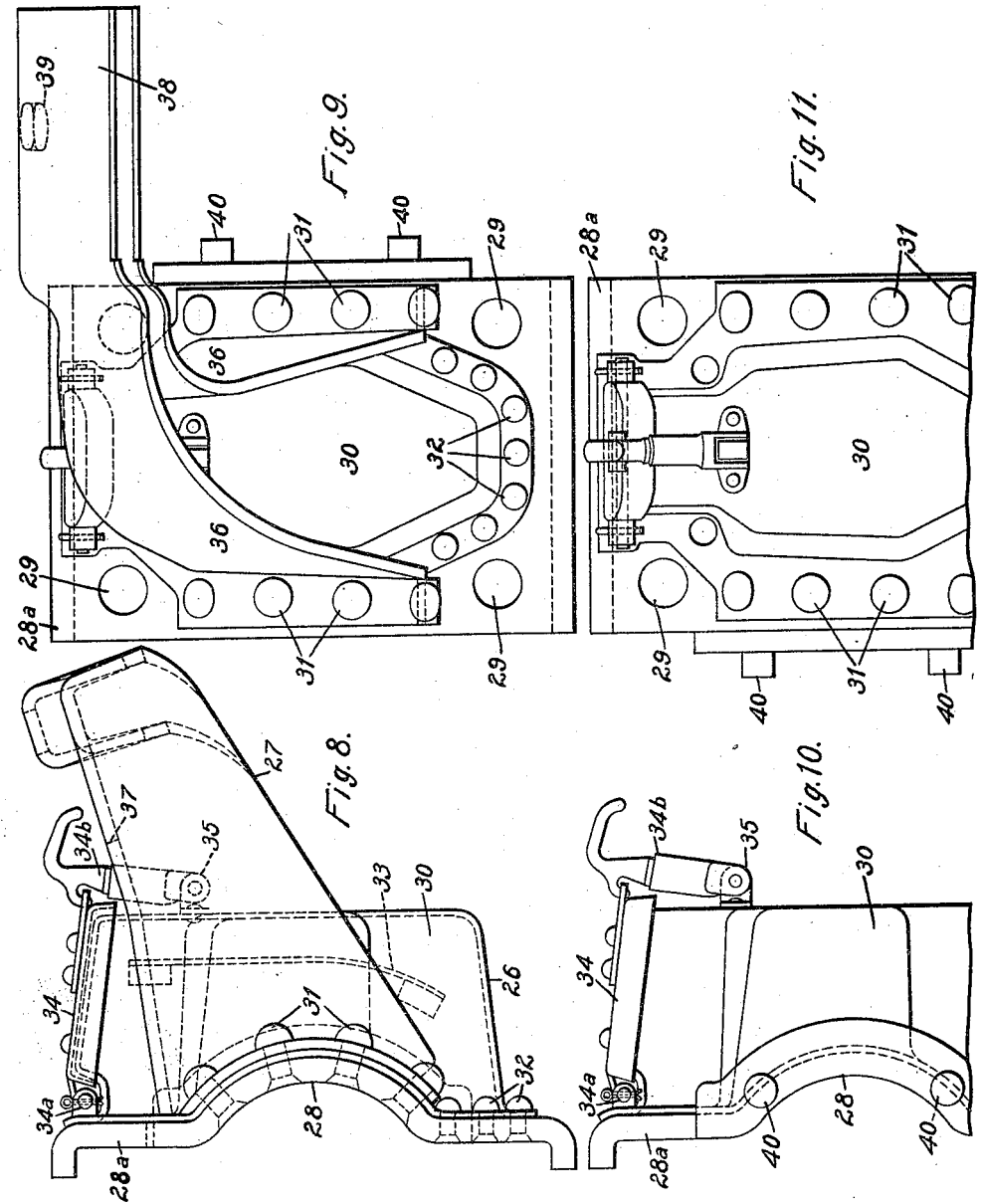

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,300,302.            Specification of Letters Patent.       Patented Apr. 15, 1919.

Original application filed September 10, 1914, Serial No. 860,974. Divided and this application filed September 27, 1916, Serial No. 122,386. Renewed October 17, 1918. Serial No. 258,619.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Dynamo-Electric Machines, of which the following is a specification, this application being a division of my copending application, Serial No. 860,974, filed Sept. 10, 1914.

My invention relates to dynamo-electric machines, and it has special reference to certain novel structural features of the stators of electric railway motors.

One of the objects of my invention is to provide an apparatus of the above-indicated character which shall be extremely light in weight without sacrificing the electrical operating characteristics or the mechanical strength of the machine, the parts being constructed chiefly of pressed steel.

Another object of my invention is to provide a dynamo-electric machine frame having independent split axle bearings comprising axle brackets and caps, the brackets being non-integrally secured to the frame, whereby variations in the distance between or in the relative position of the plane of the center lines of the armature and of the axle bearings, or in the angle that the split of the axle bearing makes relative to the frame, may be readily and inexpensively effected.

A further object of my invention is to provide an axle cap having a relatively heavy working portion and a lubricant-containing compartment of relatively light construction, and a gear-case supporting arm also of relatively light weight and located in a novel position.

A still further object of my invention is to so manufacture and combine the parts of a dynamo-electric machine frame—the majority of its members being constructed of pressed-steel—as to produce a rugged, compact, light-weight and relatively inexpensive frame, more particularly in electric railway motors.

With the above ends in view, I provide a dynamo-electric machine stator construction embodying various novel features which will be hereinafter described and subsequently pointed out in the claims.

In the accompanying drawings, Figure 1 is a view, in front elevation, of the frame of a dynamo-electric machine constructed in accordance with my invention; Fig. 2 is a view in longitudinal section, taken on the line II—II of Fig. 1; Fig. 3 is a sectional view of a modification of a portion of the structure shown in Fig. 2; Fig. 4 is a plan view, with parts broken away for clearness, of a portion of the structure shown in Fig. 1; and Fig. 5 is a view, in transverse section, taken on the line IV—IV of Fig. 2; Figs. 6 and 7 are sectional views with parts broken away, of modifications of a portion of the structure illustrated in Fig. 5; Fig. 8 is a view, in side elevation, of an axle cap and gear-case-supporting arm constructed and assembled in accordance with my invention; Fig. 9 is a view taken at right angles to the view of Fig. 8; and Figs. 10 and 11 are views, respectively similar to Figs. 8 and 9, of a different type of axle cap that is employed on the machine.

Referring to the drawings, the structure here shown comprises a dynamo-electric machine frame member 1, an axle bracket 2 and a suspension bar 3. The frame member 1 comprises a body portion or peripheral magnetizable band 4 of relatively large cross-section, and substantially polygonal in contour, that may have a plurality of internal facial recesses 5 and openings 6 communicating therewith for suitably securing a plurality of main polar projections (not shown) to the body portion 4, a plurality of smaller recesses 7 and communicating openings 8 for securing a plurality of interpolar projections (not shown) to the frame, in accordance with customary practice, and a longitudinally curved or indented portion 9. It will be understood that, if desired, the recesses 5 and 7 may be omitted and the polar projections may be disposed on the flat interior surfaces of the band 4. A preferably pressed-steel incasing member for the body portion 4 comprises an intermediate, substantially parallel-sided, polygonal portion 10 which fits around the body portion, and overhanging annular end portions 11 and 12 which may be suitably tapered or otherwise fashioned to inclose the commutator end and the rear end, respectively, of an armature (not shown). The end 11 may be provided with a suitable opening 11ª, and the end 12 with suitable hand openings 13, in accordance with usual practice. The centrally-disposed end openings in the incasing member of the frame that are adapted to receive suitable bearing housing members (not shown), are suitably reinforced at their edges, as by sets of rings 14 and 15 which are respectively disposed without and within the incasing member and which may be suitably secured thereto by means of rivets 16, or in any other suitable manner. The incasing member is preferably formed of two parts which may be lap-riveted to the body portion 4 by a plurality of rivets 16ª (Fig. 5), or the parts may be welded or otherwise suitably secured together. Fig. 3 shows another form of reinforcement, in which a circular angle iron member 14ª is suitably secured to the frame to inclose the edges of each end opening.

The width or thickness of the body portion or band 4 may be varied within predetermined limits, according to the dimensions of the intermediate portion 10 of the incasing member, as indicated by the dot-and-dash lines in Fig. 2, thereby allowing the use of a standard size incasing member, and a variable body portion to form therewith the main magnetic circuit of the machine, the capacity and other operating characteristics of the machine being determined chiefly by the size of the body portion 4, as will be understood.

The axle bracket 2 is preferably of pressed-steel construction and has a centrally-located curved portion 17 that is adapted to fit within the outer surface of the curved portion 9 of the frame, and that has circular side portions 17ª for suitably inclosing a truck axle (not shown). The bracket also has a plurality of internal recesses or pockets 18 and a plurality of external recesses 19 adjacent thereto, the flat faces of which are provided with openings 20 that are adapted for use in connection with the fastening of an axle cap, hereinafter described, to the axle bracket.

In order to strengthen the construction, a reinforcing member or shoe 21 intercepts a portion of the internally-located reinforcing rings 15 and has a curved portion 22 to fit around the inner surface of the curved portion 9 of the frame. The axle bracket may be secured to the body portion 4 and to the incasing member by means of suitable rivets 18ª, which are disposed within the recesses 17 and 18, respectively, of the bracket.

The suspension bar 3 may be of any familiar and suitable construction and is here shown as comprising an angle bar which is suitably secured to the frame by means of rivets 23 and is provided with up-turned ends 24, for purposes of convenience in installation.

Reference may now be had to Fig. 6, in which is shown a modification of the axle-bracket construction that is illustrated in Fig. 5. In order to permit of variation in the distance between the center line of the motor armature and the center line of the truck axle, one or more suitable spacing members or shims 25 may be disposed intermediate the axle bracket 2 and the curved portion 9 of the frame. It will be appreciated that, in this way, the center-line distance D' of Fig. 6 may differ by any desirable length from the corresponding length D, in Fig. 5. Moreover, by varying the position of the curved portion 17 of the axle bracket 2, relative to the curved portion 9 of the frame, the plane of the axle-bearing split, relative to the frame of the machine, may be readily varied in position, as indicated by the angles A' and A in Figs. 5 and 6, respectively, for a purpose to be described. In Fig. 7, a shim 25ª of irregular shape, having the upper end materially thicker than the lower, is disposed similarly to the shim 25 that is shown in Fig. 6. In this way, the angle which the plane of the motor armature and axle-bearing center lines make with a given datum plane, such as that of the bottom side of the frame, may be varied within predetermined limits, or, in other words, the main portion of the frame may be laterally moved, for example, raised, a certain amount relative to the axle bearing, as indicated by the dimensional lines H and H', the line H indicating the location vertically of the center line of the main frame portion or of the armature relative to the center line of the axle bearing, when no shim or a shim of regular shape, as 25, is employed, and the line H indicating the corresponding location when a shim of irregular shape, as 25ª, is utilized. It will be understood that a reversal of the position of the shim 25ª would produce an opposite relation of the center lines referred to. Moreover, the use of the shims 25ª, effects an angular difference in the plane of the axle bearing split without varying the construction of the axle bracket. Thus, accommodations for differences in either the center-line distance or plane, or in the angle referred to, may be readily effected by making slight variations in the construction or arrangement of the axle bracket without altering the construction of the main portion of the frame in any way. Either transverse or lateral movement of the main frame portion relative to the axle bracket may be easily accomplished by the use of the shims mentioned.

Referring now to Figs. 8 and 9, the structure shown comprises an axle cap 26 and an associated gear-case-supporting arm 27. The axle cap 26 comprises a suitably curved axle-receiving portion 28 of relatively heavy construction and provided with straight end projections 28ª having openings 29 for registering with the axle-bracket bolt openings 20, and a lubricant-containing compartment 30 which is preferably of light pressed-steel construction and which may be secured to the portion 28 by means of suitable sets of rivets 31 and 32, or may be welded thereto, the object being to secure a suitable liquid-tight joint. A suitable dividing member 33 is transversely disposed in the lubricant-containing compartment 30, in accordance with customary practice, for separating the liquid lubricant from the waste or other similar material that is employed for conveying the lubricant to the axle. The compartment 30 is also provided with a suitable cover member or lid 34, which is preferably pivotally attached to the main portion of the compartment at 34ª, and is held in its closed position by means of a suitable spring catch 34ᵇ that is pivotally mounted on the wall of the compartment 30 at 35.

The gear-case-supporting arm 27 is preferably of light pressed-steel construction, and has a bifurcated base portion, the arms 36 of which are suitably secured to the axle cap by means of the rivets 31, an opening 37 being cut into the upper wall of the base portion to allow it to straddle the lubricant-containing compartment 30. The other end 38 of the gear-case supporting arm is bent at substantially right angles to the base portion and has a cross-section substantially similar to a channel iron, and has, in its intermediate wall, an opening 39 to permit of suitable mechanical connection of the gear end of a gear-case (not shown), in accordance with usual practice. The opposite, or pinion, end of the gear-case may be supported in the usual manner by a projection of the motor housing, and, inasmuch as any suitable type of housing may be employed, I have not deemed it necessary to show or describe any particular type here.

It should be noted that, by varying the above-described angle A, the position of the end portion 38 of the gear-case supporting arm, relative to the frame, may be varied to permit of different distances between the center lines of the meshing gear and pinion, thereby adapting the motor for employing a relatively wide range of gear ratios, it being understood that, for a fixed center-line distance, the sum of the numbers of teeth of interchangeable sets of gears and pinions must remain constant.

Figs. 10 and 11 illustrate the type of axle cap that is employed at the commutator end of the stator frame, while Figs. 8 and 9 show the construction to be used at the opposite, or pinion, end of the frame, as will be understood from their similarity to the forms customarily employed. It will be observed that the only difference between the axle caps proper that are employed on the respective ends of the machine, resides in the particular location of a plurality of end dowel-pins 40. These pins are employed for positioning the axle brass or bushing that is embodied in various prior types of electric railway motors, and are always located on the external end of the axle cap.

I do not wish to be restricted to the specific structural details or arrangement of parts herein set forth, but desire that only such limitations shall be imposed as are indicated in the appended claims.

I claim as my invention:

1. The combination with a dynamo-electric machine frame having a peripheral recess, of a separable axle-bracket having surfaces conforming to said recess and located therewithin, and means for securing the axle-bracket to the frame.

2. The combination with a dynamo-electric machine frame having a peripheral recess, of a separable axle-bracket located in said recess and having a plurality of internal pockets, and means located in said pockets for securing the axle-bracket to the frame.

3. The combination with a dynamo-electric machine frame comprising a magnetizable band and an incasing member respectively having longitudinally extending coöperating recesses, of a separable axle-bracket located in the recess and having a plurality of internal pockets, and means located in said pockets for securing the axle-bracket to the frame.

4. The combination with a dynamo-electric machine frame comprising a magnetizable band and a box-like incasing member respectively having longitudinally extending coöperating recesses, of an axle bracket disposed in the recess and secured to said band and to said member.

5. The combination with a dynamo-electric machine frame, of a detachable axle bracket therefor, and means for varying the distance between the axial center lines of the frame and the bracket.

6. The combination with a dynamo-electric machine frame having a recess, of an axle bracket disposed in said recess, members disposed intermediate said frame and said bracket for varying the distance between the axial center lines of the frame and the bracket, and means for attaching the bracket to the frame.

7. The combination with a dynamo-electric machine frame having a surface recess of predetermined shape, of a split axle bearing having a portion of its surface shaped to fit said recess, the location of said portion determining the position of the plane of the split relative to the frame.

8. The combination with a dynamo-electric machine frame having a surface recess of substantially cylindrical shape, of a split axle bearing having a substantially cylindrical surface portion, the location of said portion determining the position of the plane of the split relative to the frame.

9. The combination with a dynamo-electric machine frame, of a detachable axle bracket, a reinforcing member disposed within said frame, and means for securing said bracket to the frame and to the reinforcing member.

10. The combination with a dynamo-electric machine frame having an external surface recess, of an axle bracket disposed therein, a reinforcing member disposed within said frame opposite said recess, and means for securing the reinforcing member, the frame, and the bracket together.

11. The combination with a dynamo-electric machine frame having a longitudinal indentation in one side thereof, of an axle bracket fitting in said indentation, a reinforcing plate fitting around said indentation within the frame, and means for attaching said bracket to the frame and to said reinforcing plate.

12. The combination with a dynamo-electric machine frame having an axle bracket, of an axle cap adapted for detachable connection with said axle-bracket and comprising a relatively heavy axle-receiving portion, a relatively light lubricant-containing compartment, and means for securing said compartment to said portion.

13. The combination with a dynamo-electric machine frame having an axle-bracket secured thereto, of an axle cap comprising a relatively heavy axle-receiving portion adapted for detachable connection with said axle-bracket, a relatively light lubricant-containing compartment, and riveting means for securing said compartment to said portion.

14. The combination with a dynamo-electric machine frame and an axle cap adapted to be attached thereto, of a gear-case-supporting arm of relatively light-weight material, and riveting means for securing said arm to said axle cap.

15. The combination with a dynamo-electric machine axle cap comprising an axle-receiving portion and a lubricant-containing compartment, of a gear-case-supporting member having its base portion secured to said cap and adapted to straddle said compartment.

16. The combination with a dynamo-electric machine axle cap comprising an axle-receiving portion and a lubricant-containing compartment externally attached thereto, of a gear-case-supporting arm of relatively light construction having a bifurcated base portion straddling said compartment and non-integrally secured to said cap.

17. The combination with a dynamo-electric machine axle cap comprising a relatively heavy axle-receiving portion and a relatively light lubricant-containing compartment non-integrally secured thereto, of a gear-case-supporting arm of relatively light construction having a bifurcated base portion straddling said compartment and non-integrally secured to said compartment and to said axle-receiving portion.

18. The combination with a dynamo-electric machine frame, of a split axle bearing non-integrally secured thereto, and means for varying the position of the main frame portion relative to said axle bearing.

19. The combination with a dynamo-electric machine frame, of a detachable axle bracket therefor, and means for laterally varying the position of the main frame portion relative to said axle bracket.

20. The combination with a dynamo-electric machine frame, of a split axle bearing non-integrally secured thereto, and means associated therewith for varying the angle of the axle-bearing split relative to the frame.

21. The combination with a dynamo-electric machine frame, of a split axle bearing non-integrally secured thereto, and means for laterally varying the position of the main frame portion relative to said axle bearing and for concurrently varying the angle of the axle-bearing split relative to the frame.

22. The combination with a dynamo-electric machine frame, of a split axle bearing non-integrally secured thereto, and a spacing member disposed intermediate said frame and said bearing and adapted to laterally vary their relative positions and to vary the angle of the axle-bearing split relative to the frame.

23. The combination with a dynamo-electric machine frame, of a split axle bearing non-integrally secured thereto, a gear-case-supporting member secured to said bearing, and means for varying the angle of the axle bearing split relative to the frame to correspondingly vary the distance between the outer end of said supporting member and a predetermined portion of the frame.

24. The combination with a dynamo-electric machine frame, of a split axle bearing comprising an axle bracket non-integrally secured to the frame, and an axle cap associated with said bracket, a gear-case-supporting arm secured to said cap, and means disposed between said frame and said bracket for varying the angle of the axle-bearing split relative to the frame to correspondingly vary the distance between the outer end of said supporting arm and a co-operating gear case supporting portion of the frame for permitting a variation in the center distances of gears and co-acting pinions.

In testimony whereof, I have hereunto subscribed my name this 22nd day of Sept., 1916.

CHARLES W. STARKER.

Copies of this patent may be obtained for five cents each, by addressing the "Commissioner of Patents, Washington, D. C."